Patented Nov. 12, 1935

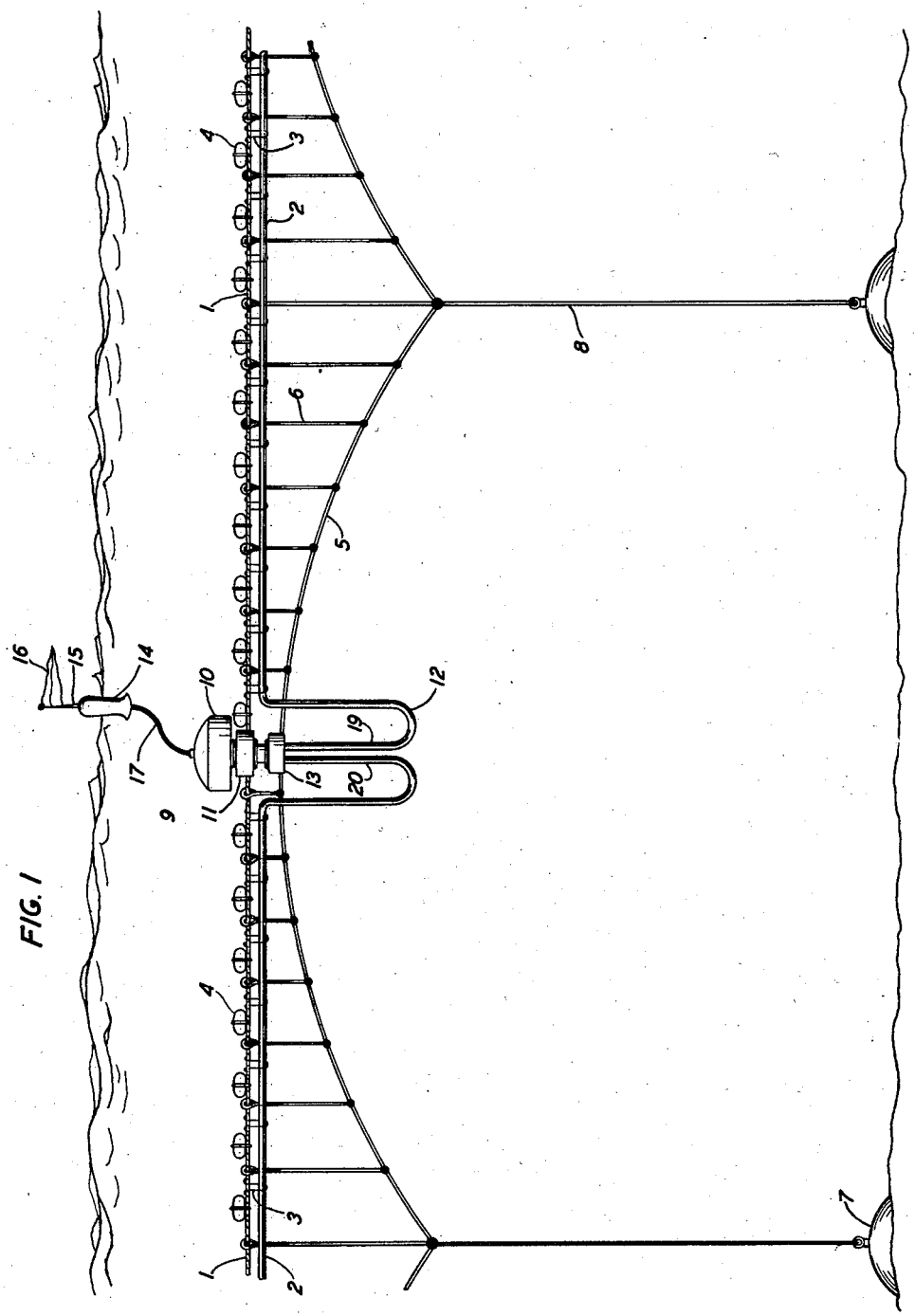

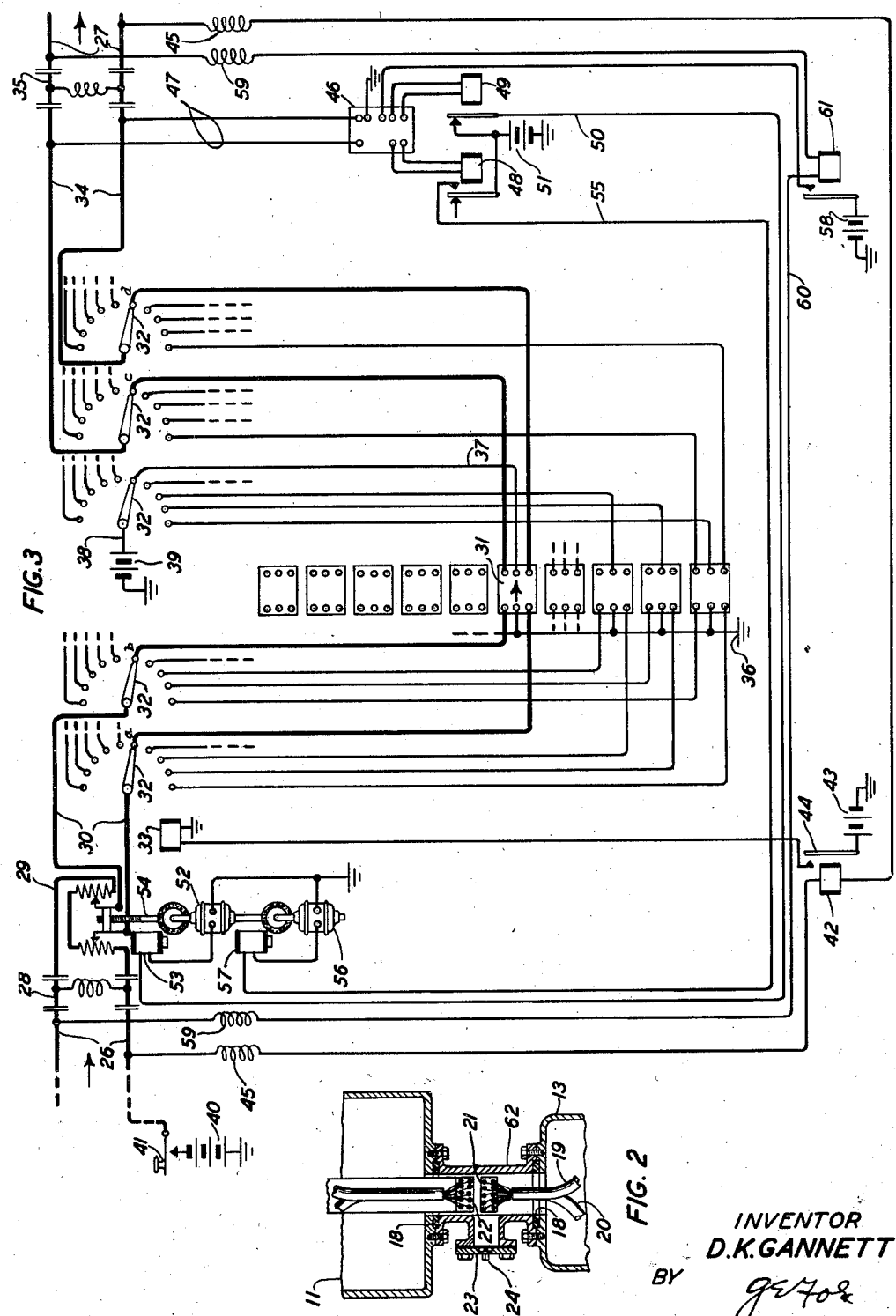

2,020,308

UNITED STATES PATENT OFFICE 2,020,308

OCEAN CABLE SYSTEM

Danforth King Gannett, Jackson Heights, N. Y., assignor to American Telephone and Telegraph Company, a corporation of New York Application June 2, 1934, Serial No. 728,740

13 Claims. (Cl. 178—63)

This invention relates to ocean cable systems and more particularly to multiplex conductor deep sea cable systems having mid-ocean repeater stations.

An object of the invention is to provide a transoceanic cable system which may have high message capacity at telephonic frequencies.

An additional object is to provide a transoceanic communication system which may incorporate low pressure multi-circuit cable structures of the general type which have been highly developed in connection with transcontinental communication and which are less costly than the usual deep sea cable structures.

Another object is to provide midocean repeating stations of a type which may readily cooperate with a suspended or floating cable and which may be quickly and easily serviced or replaced. A collateral object is to provide repeating stations with spare repeating equipment and means for bringing it into service entirely by operations performed at a remote or land terminal station so that the necessity for actual servicing or replacement of repeaters may be made very infrequent.

A further object is to provide a reliable support for a cable submerged at moderate depths so that the cable may be maintained in substantially quiescent condition free from mechanical disturbances of the wave motions and from the electrical wave disturbances occurring above the sea surface.

Another object of the invention is to make it possible to lay cable across the ocean without the employment of armoring or of special strands of the tensile strength usually required for ocean cable structures.

According to the invention, an ocean cable is divided into sections which are connected in tandem by repeater stations. The entire system of cable sections and repeater stations is maintained floating at a depth below turbulent water by buoys and is anchored to the sea bottom by a catenary system which maintains the cable substantially horizontal. The gain of the repeater stations may be controlled from a shore terminal and spare repeaters may be switched in when needed in lieu of the active ones. When it finally becomes necessary to replace amplifier tubes or power sources across the repeater stations may be readily withdrawn to the surface of the sea and new units exchanged for those removed.

Other features and objects of the invention will be apparent from a consideration of the following specification and the appended claims taken in connection with the annexed drawings in which Fig. 1 illustrates a portion of an ocean cable system according to the invention with its supports, anchorage and a submerged repeater, Fig. 2 discloses mechanical details of a portion of the repeater, and Fig. 3 shows schematically a diagram of a portion of the electric circuits at the repeater station.

Referring to Fig. 1 a messenger cable 1, which may consist of steel or other material with the requisite tensile strength and which is preferably highly resistant to the corrosive action of sea water, is shown supporting a communication cable 2 by means of messenger clips 3. The cable 2 is preferably of the multi-conductor type with a lead sheath and having its individual copper conductors insulated by means of paper. As in the usual multi-conductor practice, individual pairs of conductors of the cable are used for east bound and west bound communication in accordance with the well known four-wire circuit system. The east bound pairs may be electrically shielded from the west bound pairs. At frequent intervals along the messenger cable 1 floats 4 are connected to maintain the entire structure buoyant. In order to maintain the cable system submerged, heavy anchors 7 are provided at intervals of one or two miles along the length of the cable structure and are connected to the messenger cable 1 by a catenary cable 5 which is in turn tied to the messenger by vertical strands 6. The catenary cable 5 is connected to the anchors 7 by anchor cables 8. The anchors need only overcome the buoyancy of the messenger and all its suspended cable system including the catenary.

Repeater station 9 comprises a large float 10, the attached repeater chamber 11 and slack connecting cables 12 which terminate in a terminal box 13 bolted to the chamber 11. A surface marker or beacon buoy 14 carries a single standard 15 with a highly visible marker or automatic acetylene beacon light 16 at its top. The float 10 together with its supported repeater and slack cable is just unable to float and may be suspended in the sea from messenger 1 or held in position by the hoisting cable 17 which connects it to the floating buoy 14.

Referring to Fig. 2, it will be seen that the chamber 11 is rigidly connected to terminal box 13 through a flanged coupling member 62 to which both are bolted. All joints are sealed by water excluding gaskets 18 as indicated. The east cable section 19 and the west cable section 20 enter terminal box 13 through watertight stuffing boxes preferably of the type disclosed in United States Patent to W. S. Gorton 1,610,442, December 14, 1926. Cable sections 19 and 20 have their various conductors terminating at separate points on lower connector block 21 and these conductors may accordingly be connected to those of the repeater chamber 11 which are brought into the coupling member 62 and terminate at corresponding points of the upper connecting block 22.

Coupling member 62 is provided with a cap 23 in which there is a plug 24 to enable the interior of the chamber 11 and the associated terminal box and coupling member to be filled with nitrogen or some other inert gas at a pressure approximating that of the sea at the level at which the horizontal messenger cable is anchored.

It will be apparent that chamber 11 may be readily hoisted, disconnected and replaced by a similar chamber containing fresh tested apparatus and that the entire operation may be performed in a relatively short time without disturbing the main horizontal run of the adjacent communication cable sections. The communication cable may follow so-called land practice with its large message capacity and its wide transmission frequency band and may, moreover, be relatively inexpensive since gutta percha and heavy armoring are unnecessary. Laying such a cable is a relatively simple matter in spite of the more complex external structure which it presents since the net weight which has to be supported is greatly reduced by the buoys attached to the horizontal messenger cable and by the float attached to the repeater station. There is therefore no difficulty of high tensile stresses such as are experienced in laying the usual armored cable.

Fig. 3 illustrates some of the repeater connections between an incoming pair (east bound) of conductors 26 of cable section 20 and an outgoing pair 27 of the cable section 19 which are associated with conductors 26 to receive communication current energy therefrom which, during transition from conductors 26 to conductors 27, has been increased by the interconnecting repeater.

The communication channel for speech currents arriving over conductors 26 is by way of composite set or high pass filter 28 to automatically controlled attenuator or gain regulator 29 thence over the conductors 30 to the multipled contacts $a, b$, each set of which serves as the terminals of the input circuit of an electron discharge repeater 31 of well known type.

The terminals of the output circuit of repeater 31 are contacts $c$ and $d$. A step-by-step five path connector switch 32 may be operated by its operating magnet 33 to connect input conductors 30 to contacts $a$ and $b$, and likewise conductors 34 to contacts $c$ and $d$. Contacts $c$ and $d$ when so connected serve to transfer amplified speech currents from the output circuit of amplifier 31 to conductors 34. From conductors 34 the outgoing speech currents pass by way of composite set 35 to outgoing conductors 27 of the cable section 19. A local power supply circuit for the amplifier 31 is connected from ground 36 through the various energy consumption paths and potentiometers of amplifier 31 thence by way of conductor 37, contact $e$, connector switch 32, conductor 38 and direct current source 39 to ground. Source 39 preferably consists of an assemblage of dry cells so connected as to yield the desired current at the proper terminal E. M. F.

Ten sets of contacts similar to $a, b, c, d$ and $e$ are provided and ten amplifiers 31 are similarly connected each to its respective contacts. Accordingly, the connector switch 32 may be used to connect each of the ten amplifiers in turn at periodic intervals or when some failure of an amplifier, such as burning out of a filamentary cathode, occurs so that it will not be necessary to service the repeater station until all ten amplifiers have been used.

In order to step the switches 32 at the various stations a direct current path is provided throughout all the cable sections over the lower conductors 26 and 27 in tandem. This path is normally grounded at each shore terminal of the cable system. To send impulses over its circuit, a source 40 of direct current is inserted at one or both terminal stations between the physical circuit conductor and ground and the circuit is then opened to insert an impulse transmitter 41. Operation of the impulse transmitter causes direct current impulses to traverse the circuit and to actuate line relay 42 at each repeater station. Each line relay serves when energized to close the energizing circuit of its local stepping magnet 33 through a path from ground, source 43, an armature 44 and the cooperating contact of the relay 42. Accordingly, the stepping magnets at each station are controlled by the terminal station impulse transmitter 41. The direct current impulses are excluded from the repeating circuits by the composite sets 28 and 35 thereat. To prevent diversion of speech current energy around the repeater circuit speech current choke coils 45 are inserted in the direct current impulse path in accordance with the usual composite circuit practice.

Changes in attenuation of the long cable circuit will occur with time, due principally to the slowly decreasing emission of the cathode of the tubes comprising the amplifier unit. It is noteworthy that there should be relatively no fluctuations due to temperature fluctuations and to voltage changes of the type which occur in ordinary land lines and repeater stations. To compensate for the slow changes which occur, an automatic transmission adjusting arrangement may be required at some or all of the repeater stations.

As illustrated in Fig. 3, the transmission adjusting apparatus takes the form of an automatic level indicator 46, the input circuit terminals 47 of which are connected to the outgoing conductors 34. Indicator 46 may be of any desired type but is preferably constructed in accordance with the disclosure of the similar device Y illustrated in Fig. 1a of applicant's U. S. Patent 1,574,808, issued March 2, 1926. As is explained in detail in the specification of that patent, when it is desired to adjust the gain of the repeaters, a thousand-cycle carrier wave with a twenty-cycle interruption is transmitted over the speech transmission circuit 26 and after amplification by amplifier 31 is impressed on conductors 34. A corresponding E. M. F. is impressed on the high impedance input circuit 47 of automatic level indicator 46. The apparatus 46 serves to demodulate the thousand cycle wave and to measure the magnitude of the resulting detected twenty cycle component. If the component has a magnitude less than that which corresponds to the proper transmission level, both relays 48 and 49 remain unenergized so that conductor 50 is connected to source 51 and ground through the back contact of relay 49. Accordingly, motor 52 is energized and so also is the series electromagnetic clutch winding 53 which causes the motor to drive the threaded shaft 54 and accordingly, to move the potentiometer contacts downward so as to increase the impressed E. M. F. When the twenty cycle component attains the proper magnitude and, in fact so long as it falls within a desired working range between a certain minimum limit and a certain maximum limit, the relay 49 will be energized and will attract its armature to disconnect motor 52 from source 51. Should the twenty cycle tone exceed the maximum limit, both relays 49 and 48 will operate thus connecting source 51 by way of the armatures and front contact of the relay to circuit 55 of motor 56. Motor 56 is in series with an electromagnetic clutch 57 and operates to shift the gain control potentiometer contacts upwards so as to reduce the E. M. F. applied to conductors 30 and continues to operate until the level of the detected twenty cycle component is sufficiently reduced to permit relay 48 to deenergize whereupon the circuit of motor 56 is interrupted and the motor stops. In this manner, the output level of the amplifier 31 may be regulated. The circuit of the device 46 is normally inactive since the circuit of the source 58 of energizing current for its electron tubes is normally open. When it is desired to adjust the gain, a direct current impulse is impressed on upper conductor 26 by a source and key at the terminal station analogous to source 40 and key 41. The current traverses upper conductor 26, speech choke coils 59, conductor 60, line relay 61 and upper conductor 27. Relay 61 operates to close the circuit of source 58 so as to energize the electron discharge tubes of device 46. Additional circuit details of device 46, which per se constitutes no part of this invention, may be ascertained from U. S. Patent No. 1,574,808.

What is claimed is:

1. A deep sea cable comprising a plurality of paper insulated conductors, a water tight sheath surrounding said conductors, a messenger cable connected to said sheath at closely spaced points throughout its length, and a series of buoyant devices connected to said messenger cable to render the combination of the sheathed conductors and the messenger cable able to float, means for submerging said buoyant devices and said messenger cable at a depth below the sea surface at which the effect of surface wave motion and surface currents is inappreciable.

2. A deep sea cable comprising a buoyant system consisting of a plurality of insulated conductors together with supporting buoys attached thereto, and means for anchoring said system to sea bottom and with the conductors and the buoys wholly submerged below the zone of surface wave motions at a depth not more than two hundred feet below the surface of the sea whereby a sheath of moderate strength and an insulating volume having relatively large ratio of voids to solid dielectric substance may be safely used.

3. A conductor system encased in a water tight sheathing, a series of floats connected thereto to render the system as a whole buoyant, a number of relatively widely spaced sea anchors to anchor the system to the sea floor in a submerged position with respect to the wave disturbed portion of the sea and an inverted catenary structure connecting the anchors to said conductor system to cause it to float at a substantially horizontal position and with substantially uniform stress throughout its length.

4. A buoyant cable, anchorages to the sea floor placed at relatively widely spaced points along said cable and means for causing said anchorages to hold said cable in a substantially horizontal position and without tensile stress comprising an inverted catenary cable having its ends connected to two of said anchorages and having relatively closed spaced connections throughout its length to said buoyant cable.

5. A deep sea type cable system comprising a plurality of sections of cable, means for anchoring said sections in substantially horizontal position and submerged at a point between the surface and the sea bottom as for example at a depth of one hundred to one thousand feet beneath the surface of the sea, repeater stations connecting said sections in tandem, means for supporting said repeater stations at substantially the same depth as said cable sections, the connections between said cable and said stations comprising loops of slack cable sufficient to permit withdrawal of said repeater stations above the sea surface without disturbing said cable sections to which the stations are connected.

6. In combination a messenger cable, a multi-conductor communication cable connected thereto along its length at a series of closely adjacent points, means for rendering the assemblage of the two cables buoyant so as to be capable of floating in sea water, said multi-conductor cable having a waterproof sheath and having its conductors separated by an insulating space having a relatively large portion of voids and a relatively small portion occupied by dielectric material, and means for anchoring said cable in the sea beneath the zone of the wave disturbed water, said anchoring means having direct connections to the messenger cable at closely adjacent points throughout its length whereby the messenger cable is maintained in approximately horizontal position throughout.

7. A communication system comprising a series of cable sections, repeater stations connecting said sections in tandem, means for supporting said sections and said stations at a substantially uniform depth not more than a few hundred feet beneath the surface of the sea, each of said repeater stations comprising a chamber enclosing repeating apparatus and power sources therefor and a terminal box portion to which said chamber portion may be readily connected whereby said repeater station may be readily withdrawn above the surface of the sea and a spare chamber with tested repeater apparatus and fresh power sources may be quickly substituted for the chamber which has been in use.

8. The combination in accordance with claim 7 and means by which the repeater station may be filled with inert gas at a pressure approximately equal to that of the sea at the point where the station is normally submerged.

9. A deep sea cable repeater comprising a water tight chamber containing several sets of repeating apparatus and power sources therefor, and a sequence switch device for connecting up said sets of repeating apparatus in turn whereby impulses received by said sequence switch device at said repeater initiate operation of substituting one of the spare sets of repeating apparatus in lieu of that which was connected for active repeating operation at the time the impulses arrived.

10. A submerged repeater station comprising an operating amplifier and spare amplifiers, two cable sections connected to said station, means for transmitting signal currents over one of said cable sections to said repeater station to be amplified thereat and repeated to the other section, means for transmitting electrical control impulses over one of said cable sections to said repeater station, and means at said station responsive to received control impulses to cause said operating amplifier to be disconnected from said cable sections and a spare amplifier to be substituted for it.

11. A deep sea cable repeater comprising a water tight chamber, repeating apparatus therein comprising a plurality of sets of electron discharge tubes, power sources therefor, and a sequence switch operable by impulses received at said repeater from a remote point for disconnecting a set of electron discharge devices which has been in use and for connecting in lieu thereof one of the other sets.

12. A deep sea communication system comprising a series of submerged cable sections connected in tandem by repeater stations, each of said repeater stations comprising amplifying apparatus, means for varying the amount of amplification which said apparatus introduces, and means controlled by impulses transmitted over said cable for adjusting the amplification at each repeater station to cause the amplified current to attain the proper energy level.

13. An ocean cable system comprising a plurality of sections, submerged repeater stations comprising active repeaters connecting said sections, said repeater stations also comprising spare repeaters, means controlled from a shore terminal for adjusting the gain of said active repeaters from time to time, and means also controlled from a shore terminal for disconnecting the active repeaters and connecting in a spare repeater when adjustment of gain control of the active repeaters is no longer sufficient to maintain the proper transmission levels.

DANFORTH KING GANNETT.